Patented July 16, 1929.

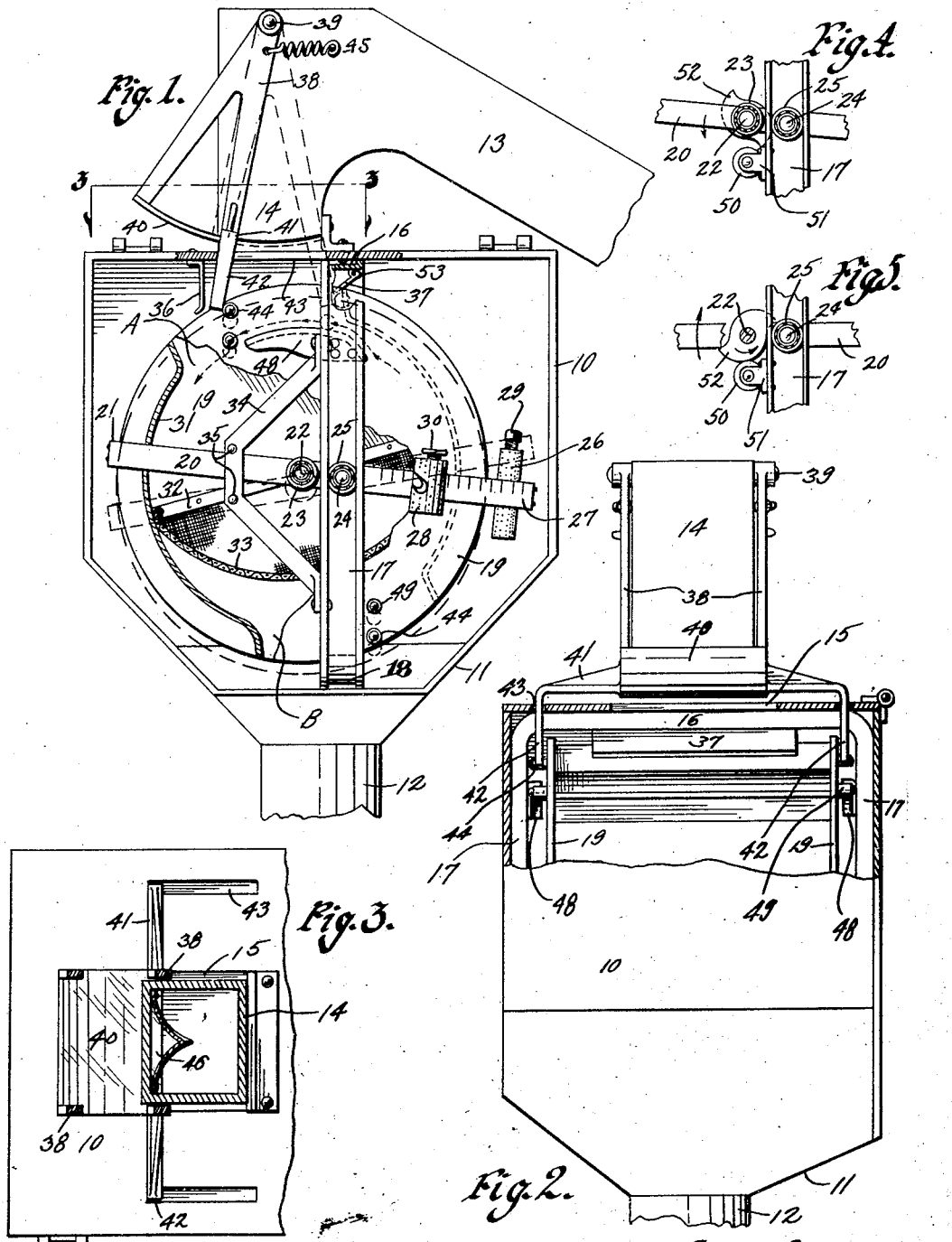

1,721,025

UNITED STATES PATENT OFFICE.

WIGGERT LANGERAK, OF PELLA, IOWA, ASSIGNOR OF ONE-HALF TO MEYER LANGERAK, OF PELLA, IOWA.

GRAIN-WEIGHING MACHINE.

Application filed February 4, 1926. Serial No. 85,923.

The object of my invention is to provide a grain weighing machine of simple, durable and inexpensive construction.

More particularly, it is my object to provide a grain weighing machine of the type having a rotor balanced on a scale beam device and adapted to be raised and lowered by the weight of the grain in the pockets with which the rotor is provided.

In such a machine, it is one of my special purposes to provide means for insuring the positive raising of the rotor during the rotation thereof for emptying the pockets.

Still another purpose is to provide means for permitting raising and stopping the rotor and rotation of the rotor with the least shock on the parts.

Still another purpose is to provide in such a machine means for automatically stopping the flow of grain to the weighing mechanism during the emptying operation, said means being adapted to be moved to inoperative position by the movement of the rotor, and having parts adapted to stop the rotation of the rotor at the point where the rotor stands in position for further filling.

With these and other objects in view, my invention consists in the construction, arrangement and combination of the various parts of my grain weighing machine, whereby the objects contemplated are attained, as hereinafter more fully set forth, pointed out in my claims, and illustrated in the accompanying drawings, in which:

Figure 1 shows a side elevation of a weighing machine embodying my invention, parts of the rotor being broken away and parts being shown in section.

Figure 2 is an end elevation of the weighing machine, parts being broken away and parts being shown in section.

Figure 3 is a detail, sectional view taken on the line 3—3 of Figure 1.

Figure 4 is a detailed view of part of the mechanism, particularly the raising cam; and Figure 5 is a similar view showing the cam in another position.

In the accompanying drawings, I have used the reference numeral 10 to indicate generally a casing having the tapered bottom 11, which is adapted to discharge grain into a chute or pipe 12.

A conveyor 13 is arranged with its discharge chute 14 just above the casing 10.

The casing 10 is provided in its top with an opening 15 to permit the discharge of grain from the conveyor chute 14 through the top of the casing 10 into the rotor of the weighing mechanism.

Mounted in the casing 10 is a weighing mechanism, which will now be described.

Supported on the casing at the top thereof is a cross frame member indicated generally by the character 16, which at its ends is connected with vertical side frame members 17, having the form of outwardly opening channels. The lower ends of the portions 17 of this frame are connected by another cross frame member 18.

It will thus be seen that there is inside the casing 10 a substantially rectangular frame composed of the members 16, 17 and 18.

The rotor of the weighing mechanism comprises a pair of laterally spaced discs 19, shown in Figures 1 and 2. I provide a U-shaped scale beam structure having the side arms 20, and the connecting member 21, shown in Figure 1. Stub shafts 22 are fixed to the discs 19 and are journaled by means of roller bearings 23 in the scale beam arms 20. Stub shafts 24 extend from the arms 20 and are journaled in roller bearings 25 supported by the frame members 17.

It will thus be seen that the discs 19 of the rotor are rotatably mounted on the arms 20 by means of the shafts 22 and are balanced by means of the arms 20 on the frame members 17, so that if it were not for the weights hereinafter mentioned on the arms 20, the discs would normally stand at the lower position of their up-and-down movement.

There is, however, provided on one of the arms 20 the weight 26. The arm 20 is calibrated as at 27 and has mounted on it an adjustable scale weight 28. The weights 26 and 28 may be locked in position on their respective arms 20 by means of set screws 29 and 30.

On account of the use of the weights 26 and 28, the weighted ends of the arms 20 naturally tend by gravity to drop downwardly, thus swinging the arms 20 on the fulcrums formed by the shaft 24 and their bearings, and tending to hold the discs 19 in their raised position. The discs 19 form the side walls of the pockets.

In the form of my weighing machine herein shown, I have disclosed two pockets with a common flexible bottom. Between the discs 19 are arranged the wall members 31, which extend around the discs near the peripheries thereof opposite each other for such appropriate distances as to provide opposite intake and outlet openings.

A metal band 32 is extended around the interior of the rotor thus formed at the middle thereof, and half way between the openings just mentioned, which I have indicated generally by the reference letters A and B, and will for convenience refer to as the mouths of the pockets.

A flexible partition or bottom 33 divides the rotor into two pockets, and has its edge fastened to the walls of the rotor by means of the band 32.

Secured to the frame members 17 are brackets 34, which are provided with stops 35 to engage the arms 20 and limit the up-and-down tilting movement of the weighing rotor.

The rotor shown in Figure 1 turns in anti-clockwise direction.

Secured to the underside of the top of the casing 10 above the left-hand portion of the rotor is a downwardly hanging apron 36 to prevent the grain from spilling into the casing.

Above the right-hand part of the roller, an apron 37 is pivotally hung and is arranged to engage and slide on the discs 19 of the rotor, so that it can never hang in position to prevent the raising of the rotor.

I provide a novel cut-off and stop structure for preventing inflow of grain into the casing during the time the grain is being discharged from one of the pockets. This cut-off comprises a pair of arms 38 pivoted at their upper ends on the chute 14, as at 39. These arms support a cut-off plate 40, which is adapted to slide from position shown in dotted lines in Figure 1 for closing the lower end of the chute 14 to position shown in full lines in said figure, where the cut-off plate is inoperative.

At the lower ends of the arms 38 are mounted laterally extending arms 41, which terminate in downwardly extending arm portions 42, projecting through slots 43 in the top of the casing 10 to positions where their lower ends stand just outside the respective discs 19, as shown in Figures 1 and 2.

On the outer sides of the discs 19 are arranged roller stops 44.

I will now explain the operation of my improved weighing machine and will then describe the construction and operation of the means for insuring the positive raising of the machine after each emptying operation, and the modified form of such means, whereby such raising is effected with the least shock and vibration to the parts.

As shown in Figure 1, the mechanism is in position for filling the upper pocket. The rollers 44 engage the arms 42, which are at the left-hand limit of their movement. The rotor is in its raised position, being held there by the weights 26 and 28 on the arms 20.

The rotor has been rotated to a point where the band 32 has passed horizontal, so that when the grain conveyed upwardly through the conveyor 13 is dropped through the chute 14, it passes through the opening 15 in the top of the casing 10 into the upper pocket of the rotor. This pocket, it will be understood, is formed by the members 31, the bottom 33, and the discs 19.

It will be understood that the weight 28 has been adjusted for weighing the desired amount of grain at each operation.

If we assume that the weight has been adjusted for weighing 16 pounds of oats, to-wit, half a bushel, it will be seen that when 16 pounds of oats have been discharged into the upper pocket, the rotor will be lowered against the resistance of the weights 26 and 28, and the rollers 44 will drop below the lower ends of the arms 42. Thereupon the arms 38 will swing by gravity to position for moving the closure plate 40 underneath the discharge end of the chute 14 to its closing position. This movement is made positive by means of the springs 45 connected with the arms 38 and the chute 14.

No more grain will be discharged from the chute 14 until the cut-off plate 40 is moved back to its full line position shown in Figure 1.

When the rollers 44 drop below the ends of the arms 42, then it will be obvious that because the greater part of the weight in the pocket is on the left side of the rotor, the rotor will rotate with increasing rapidity to position for discharging the grain into the lower part of the casing 10 from whence it can pass out through the pipe 12.

As soon as the weight of the grain carried by the rotor pocket is reduced, the weights 26 and 28 will swing the arms 20 on the shafts 24 as fulcrums and again raise the rotor, so that when the momentum of the rotor swings it around until the roller stops 44 diametrically opposite those which originally engaged the arms 42 have moved to the upper part of the casing 10, they will engage the arms 42 and swing said arms to the left from their dotted line positions shown in Figure 1 to their full line positions, thus opening the cut-off plate 40 and permitting grain to be again discharged from the chute 14 into the other pocket of the rotor.

The grain will continue to be discharged from the first pocket until it is all out, and the second pocket will be filled, and this cycle of operations will continue so long as the grain supply is kept up.

It may be mentioned in this connection that in order to facilitate the convenient discharge of the grain from the chute into the pockets, I have provided in the chute 14 adjacent to the left-hand wall thereof, as shown in Figures 1 and 3, a V-shaped spreader 46, which extends to the top of the chute which serves to close the space formed between the spreader and the left-hand wall of the chute. This spreader 46 causes the grain to be spread out, and makes the delivery of the grain to the pockets of the rotor more satisfactory.

I have found that it may be desirable to positively insure the raising of the rotor during a pocket emptying operation by means other than the weights 26 and 28. I have provided and shown two forms of means for accomplishing this purpose, one of which is shown in Figure 1 and the other in Figures 4 and 5, the latter form shown in Figures 4 and 5 being really my preferred form.

In the form shown in Figure 1, I have mounted on the frame members 17 near the upper part thereof cams 48. On the discs 19 inwardly from the rollers 44 and slightly in advance thereof are diametrically opposite rollers 49, which are so arranged that when the rotor is moved for discharging the grain for one pocket, one pair of rollers 49 will ride upwardly on the cams 48 just before the rollers 44 reach the arms 42 for insuring the positive raising of the rotor, and thus insuring that the rotor will be raised in time to cause the rollers 44 to engage the arms 42.

In Figures 4 and 5, I have shown a slightly modified form of structure for positively insuring the raising of the rotor during its rotation and for accomplishing the raising with a minimum of shock or vibration on the parts.

In the form of the device illustrated in Figures 4 and 5, I have shown on the frame members 17 adjacent to and below the shafts 22, rollers 50 mounted in brackets 51.

On each shaft 22, standing above the respective rollers 50, is mounted a cam having generally an S shape and indicated by the numeral 52. These cams are so shaped that when the rotor is in its raised position, as shown in full lines in Figure 1, the cams stand above the rollers 50, as illustrated in Figure 4.

When the upper pocket is filled with a sufficient weight of grain to overcome the balanced weights 26 and 28, the rotor tilts downwardly until the cams 52 rest on the rollers 50. After the rotor rotates toward position for fully discharging the filled pocket and for bringing the mouth of the unfilled pocket to receiving position, the dwells of the cams 52 ride on the rollers 50, as shown in Figure 5, for thus positively raising the rotor in cooperation with the weights 26 and 28.

The cams are so arranged on the shafts 22 and their faces are so cut, that the rotor is raised at such a time in its rotation as to cause the rollers 44 to engage the arms 42, when said arms are in the position shown by dotted lines in Figure 1, for swinging the arms to the left and opening the cut-off plate 40 by moving it to its full line position shown in Figure 1.

One difficulty which I have experienced with weighers of this kind has arisen from the fact that when the grain is discharged from the loaded pocket, the rotor will sometimes stop with a jerk. Where the cams shown in Figures 4 and 5 are employed, this shock or blow imparted to the mechanism is substantially eliminated. I therefore prefer the form of device shown in Figures 4 and 5.

It will be noted from the foregoing that I have provided a weighing machine which is in certain respects an improvement upon the weighing machine disclosed in my prior Patent, No. 1,572,658, issued February 9, 1926.

I have in the present weighing machine provided a simple automatic cut-off device actuated by the operation of the weighing mechanism and adapted to automatically shut off the flow of grain from the chute 14 during the period when the rotor is moved from filling position for one pocket toward position for fully discharging from that pocket and for filling the other pocket.

Thus no grain can pass into the casing 10 while the rotor is moving, except during the short period while the plate 40 is being moved to open position and in that short period, the mouth of the second pocket will be under the open part of the chute.

It will be noted also that the arms which support the cut-off plate have extensions which serve as stops for the rotor for holding it in filling position. These arms are also engaged by the rotor for opening the cut-off plate at the proper time.

This structure facilitates the accurate working of the machine and prevents any likelihood of its clogging.

It will also be noted that I have in the present machine provided means for insuring the positive raising of the rotor during its rotation through a half circle after a pocket has been loaded and is being moved to discharging position. For this purpose, I have shown the two forms already referred to. The second form disclosed in Figures 4 and 5 embodies the use of the cams 52, whereby this raising operation is performed with a minimum of shock or vibration on the parts.

I desire to call attention to the advantages of using the spreader 46, which facilitates the spreading of the grain at the time of its discharge into the pocket.

It may be mentioned also that the aprons 36 and 37 help to prevent any discharge of unweighed grain and insure that all of the grain will be discharged into the pocket of the weighing rotor. The apron 37 is of such length and is so pivoted that it rides on the discs 19 and yet never interferes with the vertical movement of the rotor.

The apron 37 may be provided with a stop shoulder 53 if desired for preventing its dropping to vertical position or it may be hung a little off its center of gravity for accomplishing the same purpose.

It will be understood that changes may be made in the details of the structure and arrangement of the parts of the weighing machine herein disclosed without departing from the real spirit and purpose of the invention claimed, and it is my intention to cover by my claims any modifications in structure or use of mechanical equivalents, which may be reasonably included within the scope of my invention and of my claims.

I claim as my invention:

1. In a weighing machine, a casing, a vertically movable weighing rotor therein having pockets, said casing having an opening in its top through which grain may be discharged into the pockets of the rotor, and aprons extending from the top of the casing downwardly toward the rotor for preventing grain from being discharged into the casing outside the rotor, one of said aprons being pivotally supported to ride on the rotor in position always inclined somewhat from the vertical.

2. In a device of the class described, a casing, a weighing rotor therein rotatively mounted, an elevating conveyor terminating in a vertical chute supported to discharge grain through its lower end into said rotor, a substantially V-shaped spreader having its apex arranged vertically and adjacent to the inner face or back wall of said chute, the apex end of said spreader being positioned substantially midway between the vertical walls of said chute.

Des Moines, Iowa, February 1, 1926.

WIGGERT LANGERAK.